(12) United States Patent  
Leidefeldt et al.

(10) Patent No.: US 11,378,023 B2
(45) Date of Patent: Jul. 5, 2022

(54) GAS TANK ARRANGEMENT

(71) Applicant: Volvo Truck Corporation, Gothenburg (SE)

(72) Inventors: Marcus Leidefeldt, Gothenburg (SE); Bengt Henström, Alingsås (SE); Peter Gollungberg, Kyrkesund (SE)

(73) Assignee: Volvo Truck Corporation, Gothenburg (SE)

( * ) Notice: Subject to any disclaimer, the term of this patent is extended or adjusted under 35 U.S.C. 154(b) by 0 days.

(21) Appl. No.: 16/343,523

(22) PCT Filed: Oct. 21, 2016

(86) PCT No.: PCT/EP2016/075353
§ 371 (c)(1),
(2) Date: Apr. 19, 2019

(87) PCT Pub. No.: WO2018/072839
PCT Pub. Date: Apr. 26, 2018

(65) Prior Publication Data
US 2019/0338713 A1    Nov. 7, 2019

(51) Int. Cl.
| | |
|---|---|
| *F02D 19/06* | (2006.01) |
| *F02D 19/02* | (2006.01) |
| *F02M 21/02* | (2006.01) |
| *F02M 21/06* | (2006.01) |
| *B60K 15/03* | (2006.01) |

(52) U.S. Cl.
CPC ........... *F02D 19/06* (2013.01); *F02D 19/021* (2013.01); *F02D 19/027* (2013.01);
(Continued)

(58) Field of Classification Search
CPC ...... F02D 19/06; F02D 19/021; F02D 19/027; F02D 19/0684; F02M 21/0224; F02M 21/0236; F02M 21/0245; B60K 15/03
(Continued)

(56) References Cited

U.S. PATENT DOCUMENTS

| | | | |
|---|---|---|---|
| 5,960,809 A | 10/1999 | Keller | |
| 6,378,489 B1 * | 4/2002 | Stanglmaier | F02B 1/12 |
| | | | 123/304 |

(Continued)

FOREIGN PATENT DOCUMENTS

| | | |
|---|---|---|
| CN | 102261284 A | 11/2011 |
| CN | 102400799 A | 4/2012 |

(Continued)

OTHER PUBLICATIONS

International Search Report and Written Opinion for International Patent Application No. PCT/EP2016/075353, dated Sep. 19, 2017, 9 pages.

(Continued)

*Primary Examiner* — Lindsay M Low
*Assistant Examiner* — Omar Morales
(74) *Attorney, Agent, or Firm* — Withrow & Terranova, PLLC

(57) ABSTRACT

The present invention relates to a gas tank arrangement (100) for an internal combustion engine (102), said gas tank arrangement (100) comprising a gas tank (104) for containing a combustible gas, and an additional gas tank (106) arranged in upstream fluid communication with said internal combustion engine (102), wherein the gas tank arrangement (100) further comprises a valve arrangement (108) positioned in fluid communication with the internal combustion engine (102), wherein the valve arrangement (108) is further arranged in upstream fluid communication with the gas tank (104) and the additional gas tank (106) for controllably direct combustible gas from the internal combustion engine (102) to either the gas tank (104) or the additional gas tank (106).

14 Claims, 4 Drawing Sheets

(52) U.S. Cl.
CPC ..... *F02D 19/0647* (2013.01); *F02D 19/0684* (2013.01); *F02M 21/0224* (2013.01); *F02M 21/0236* (2013.01); *F02M 21/0239* (2013.01); *F02M 21/0245* (2013.01); *F02M 21/0287* (2013.01); *F02M 21/06* (2013.01); *B60K 15/03* (2013.01); *B60K 2015/03013* (2013.01); *B60K 2015/03144* (2013.01); *B60K 2015/03157* (2013.01)

(58) Field of Classification Search
USPC ........................................................ 123/575
See application file for complete search history.

(56) References Cited

U.S. PATENT DOCUMENTS

| | | | |
|---|---|---|---|
| 2005/0224057 A1* | 10/2005 | Tokumaru | F02D 19/023 123/516 |
| 2008/0053413 A1 | 3/2008 | Donahue et al. | |
| 2011/0088811 A1* | 4/2011 | Shudo | F02D 19/0647 141/248 |

FOREIGN PATENT DOCUMENTS

| | | |
|---|---|---|
| CN | 104047739 A | 9/2014 |
| EP | 1541858 A1 | 6/2005 |
| EP | 1586762 A1 | 10/2005 |
| JP | 2000045889 A | 2/2000 |
| JP | 2007146806 A | 6/2007 |
| WO | 2013093544 A1 | 6/2013 |

OTHER PUBLICATIONS

International Preliminary Report on Patentability for International Patent Application No. PCT/EP2016/075353, dated Oct. 30, 2018, 6 pages.

First Office Action for Chinese Patent Application No. 201680090180.4, dated Jun. 24, 2021, 18 pages.

* cited by examiner

GAS TANK ARRANGEMENT

CROSS-REFERENCE TO RELATED APPLICATION(S)

This application is a 35 U.S.C. § 371 national phase filing of International Application No. PCT/EP2016/075353, filed Oct. 21, 2016, of which the disclosure is hereby incorporated reference herein in its entirety.

TECHNICAL FIELD

The present invention relates to a gas tank arrangement for an internal combustion engine. The invention also relates to a vehicle comprising such a gas tank arrangement and a method for controlling flow of combustible gas in a gas tank arrangement. The invention is applicable on vehicles, in particularly low, medium and heavy duty vehicles commonly referred to as trucks. Although the invention will mainly be described in relation to a truck, it may also be applicable for other type of vehicles such as e.g. working machines, buses, boats etc.

BACKGROUND

In relation to propulsion systems for heavy duty vehicles, internal combustion engines are frequently used. These internal combustion engines are most often propelled by a combustible fluid such as e.g. diesel or petrol. However, in order to further reduce engine emissions of the vehicles, alternative propulsion methods and/or fuels are being used, either alone or in combination with the well known combustible fluids. These may include, for example, ethanol or electrical propulsion from an electric machine, etc.

As a further alternative, a combustible gas, such as e.g. compressed natural gas, DME, biogas, etc. has been found a suitable propulsion fuel for vehicles in the form of trucks. The combustible fluids can be used in combination with the combustible gas for propelling the internal combustion engine, in the following also referred to as a dual fuel internal combustion engine. Since the residuals from the combustible gas are relatively environmentally friendly in comparison to e.g. diesel fuel, pollution from the emissions thereof is reduced for these types of engines.

A problem with engines being propelled by the above described combustible gas is that if leakage of gas occurs from e.g. the gas tank or other positions of the system there is a risk of green house gas emission. Unwanted leakage of this kind also has an economical aspect since the fuel consumption will increase. Moreover, the combustible gas needs to be provided at relatively high pressure levels when being delivered to the fuel injectors of the engine. This is a problem as the combustible gas is initially contained in a low pressure gas tank in liquid form and thus needs to be pressurized and converted into gas phase before delivery to the internal combustion engine.

There is thus a need to provide an improved gas tank arrangement which is able to handle the various phases of the combustible gas contained in the system for improving the utilization of the combustible gas in the system.

SUMMARY

It is an object of the present invention to provide a gas tank arrangement which at least partially overcomes the deficiencies of the prior art. This is achieved by a gas tank arrangement according to claim 1.

According to a first aspect of the present invention, there is provided a gas tank arrangement for an internal combustion engine, the gas tank arrangement comprising a gas tank for containing a combustible gas, and an additional gas tank arranged in upstream fluid communication with the internal combustion engine, wherein the gas tank arrangement further comprises a valve arrangement positioned in fluid communication with the internal combustion engine, wherein the valve arrangement is further arranged in upstream fluid communication with the gas tank and the additional gas tank for controllably direct combustible gas from the internal combustion engine to either the gas tank or the additional gas tank.

The wording "combustible gas" should in the following and throughout the entire description be interpreted as a gas which can be ignited, either self-ignited by compression or be ignited by e.g. a spark plug. The invention should thus not be limited to any specific combustible gas. However, as a non-limiting example, the combustible gas may be natural gas, which is described further below. Other alternatives are of course conceivable such as e.g. DME or biogas, etc. The combustible gas which can be provided in the gas tank can be in liquid phase and in gas phase. Hence, the wording "combustible gas" should be interpreted to include liquefied gas as well as gas in gas phase. Accordingly, a lower portion of the gas tank can be provided with liquid combustible gas while an upper portion of the gas tank can be provided with combustible gas in gas phase.

Moreover, as described above the valve arrangement is positioned in fluid communication with the internal combustion engine. This should also be construed as the valve arrangement being positioned in fluid communication with e.g. a combustible gas rail of the internal combustion engine. Such combustible gas rail may comprise fuel/gas injectors for controllably direct gaseous fuel into the cylinders of the internal combustion engine. Accordingly, combustible gas delivered from the internal combustion engine should be understood to mean combustible gas delivered from the combustible gas rail of the internal combustion engine.

An advantage is that combustible gas from the internal combustion engine can be redirected to one of the gas tank and the additional gas tank based on the current state of the combustible gas. Such current state may relate to the gas pressure level of the combustible gas as will be described further below. Hence, irrespective of the pressure level of the combustible gas delivered from the internal combustion engine, the combustible gas can be directed to either the gas tank or the additional gas tank for re-use thereafter of the combustible gas. Hereby, the combustible gas from the internal combustion engine need not be wasted to e.g. the atmosphere. This will thus further improve the fuel consumption of the vehicle provided with such a gas tank arrangement connected to an internal combustion engine. Also, a more environmentally friendly gas tank arrangement is provided.

According to an example embodiment, the valve arrangement may be a gas pressure controlled valve arrangement.

Hereby, the valve directs the combustible gas from the internal combustion engine to the gas tank or the additional gas tank in dependence of a gas pressure level thereof.

According to an example embodiment, the valve arrangement may be controllable between a first state in which combustible gas from the internal combustion engine is directed to the gas tank and a second state in which combustible gas from the internal combustion engine is directed to the additional gas tank, wherein the valve arrangement is controllable to be switched from the first state to the second state when a pressure level of the combustible gas from the internal combustion engine exceeds a predetermined threshold limit.

Hereby, low pressure combustible gas is directed to the gas tank while combustible gas with slightly higher gas pressure is directed to the additional gas tank. According to a non-limiting example embodiment, the gas pressure level of the combustible gas directed to the gas tank may be below 50 bar, while the gas pressure level of the combustible gas directed to the additional gas tank may be above 50 bar. Hence, when the pressure level of the combustible gas from the internal combustion engine exceeds a limit around 50 bars, the valve arrangement is switched to the second state. It should however be readily understood that the above described gas pressure levels are merely for descriptive purposes and may of course be different depending on the specific application and engine, etc.

According to an example embodiment, the valve arrangement may be a mechanically controlled valve arrangement.

Hereby, no control unit or control electronics is needed for controllably direct the combustible gas from the internal combustion engine to the gas tank or the additional gas tank. However, the valve arrangement may also be an electronically controlled valve. In such situation, the electronically controlled valve may be connected to a pressure sensor which detects the pressure level of the combustible gas from the internal combustion engine and controls the valve arrangement to be positioned in one of the first or second states.

According to an example embodiment, the gas tank may be arranged in upstream fluid communication with the additional gas tank.

Hereby, combustible gas from the gas tank may also be delivered to the additional gas tank. This is advantageous in cases where the gas pressure level of the gas tank exceeds a predetermined limit at which the gas tank needs to be vented. Instead of venting to the atmosphere, the pressure level of the gas tank can be reduced by directing combustible gas in gaseous phase to the additional gas tank. A further advantage is that the pressure level in the gas tank can be reduced before refilling the gas tank. Hereby, the operator of the vehicle can thus control e.g. the compressor described below before he/she initiates refill of the fuel tank. Reducing the pressure level of the gas tank will speed up the process of refilling the gas tank. According to an example embodiment, the gas tank arrangement may further comprise a compressor arranged in fluid communication between gas tank and the additional gas tank.

Hereby, the combustible gas directed from the gas tank can be increased to a pressure level corresponding to the pressure level of the combustible gas in the additional gas tank. A compressor is also advantageous as an operator of the vehicle can control the compressor and thereby control the flow of combustible gas from the gas tank to the additional gas tank when desired.

According to an example embodiment, the gas tank arrangement may comprise a fuel supply line between the gas tank and the internal combustion engine, the gas tank arrangement further comprises a first fuel pump arranged in the fuel supply line.

Hereby, combustible gas can be directed from the gas tank to the internal combustion engine. Preferably, the fuel supply line is connected to a lower portion of the gas tank for directing combustible gas in liquid phase from the gas tank. The combustible gas in liquid phase is thus initially directed to the first fuel pump for increasing a pressure level thereof.

According to an example embodiment, the additional gas tank may be connected to the fuel supply line at a position downstream the first fuel pump.

Hereby, the combustible gas from the gas tank and the combustible gas from the additional gas tank are mixed with each other at a position, i.e. a mixing point, downstream the first fuel pump. Preferably, combustible gas in liquid phase is delivered from the gas tank to the mixing point and combustible gas in gas phase is delivered from the additional gas tank to the mixing point. However, other phases of the combustible gas delivered from the gas tank and the additional gas tank are also conceivable. An advantage of mixing combustible gas in liquid phase with combustible gas in gas phase is that the efficiency of a second fuel pump, which is further described below, can be reduced by the combustible gas in gas phase as the flow through of the second fuel pump can be reduced.

According to an example embodiment, the gas tank arrangement may comprise a gas converter arrangement arranged to convert liquefied combustible gas to compressed combustible gas, the gas converter arrangement being positioned in the fuel supply line downstream the first fuel pump.

Hereby, the combustible gas can be converted into pressurized gas in gas phase which is suitable for delivery to the fuel injection system of the internal combustion engine.

According to an example embodiment, the gas converter arrangement may comprise a second fuel pump and an evaporating unit positioned in fluid communication with the second fuel pump.

The wording evaporating unit should be understood to mean a device or arrangement which converts a fluid from liquid phase to gas phase. Such evaporating unit may, as a non-limiting example, be a heat exchanger.

The fuel pump thus pressurizes the liquid combustible gas before delivery to the evaporating unit, which transforms the compressed liquefied gas to compressed gas in gas phase prior to delivery to the fuel injection system of the internal combustion engine.

According to an example embodiment, the gas tank arrangement may further comprise a second additional gas tank arranged in downstream fluid communication with the gas tank.

Hereby, the second additional gas tank may contain and controllably deliver high-pressure combustible gas to the fuel injection system of the internal combustion engine. In cases where the second fuel pump, for some reason, is unable to sufficiently increase the pressure level of the combustible gas, the second additional gas tank contains sufficiently pressurized combustible gas to be delivered to the internal combustion engine. It is also advantageous to store/contain high pressure combustible gas that can be used when starting the engine before the second fuel pump has been able to sufficiently pressurize the combustible gas delivered from the gas tank.

Thus, according to an example embodiment, the second additional gas tank may be a high pressure gas vessel configured to contain compressed combustible gas adapted to be delivered to a fuel injection system of the internal combustion engine.

According to a second aspect, there is provided a method for controlling flow of combustible gas in a gas tank arrangement, the gas tank arrangement comprising a gas tank for containing a combustible gas, and an additional gas tank, the gas tank and additional gas tank being arranged in fluid communication with the internal combustion engine, wherein the method comprises the steps of determining a pressure level of a combustible gas delivered from the internal combustion engine; and controlling the combustible gas to be delivered to the additional gas tank if the pressure level of the combustible gas from the internal combustion engine is above a predetermined threshold limit.

Effects and features of the second aspect of the present invention are largely analogous to those described above in relation to the first aspect of the present invention.

According to a third aspect, there is provided a vehicle comprising an internal combustion engine and a gas tank arrangement according to any of the embodiments described above in relation to the first aspect of the present invention, wherein the internal combustion engine is arranged downstream the gas tank arrangement.

According to an example embodiment, the internal combustion engine may be a dual fuel internal combustion engine.

Effects and features of the third aspect of the present invention are largely analogous to those described above in relation to the first aspect of the present invention.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

The above, as well as additional objects, features and advantages of the present invention, will be better understood through the following illustrative and non-limiting detailed description of exemplary embodiments of the present invention, wherein.

DETAILED DESCRIPTION OF EXAMPLE EMBODIMENTS OF THE INVENTION

Figure 1:
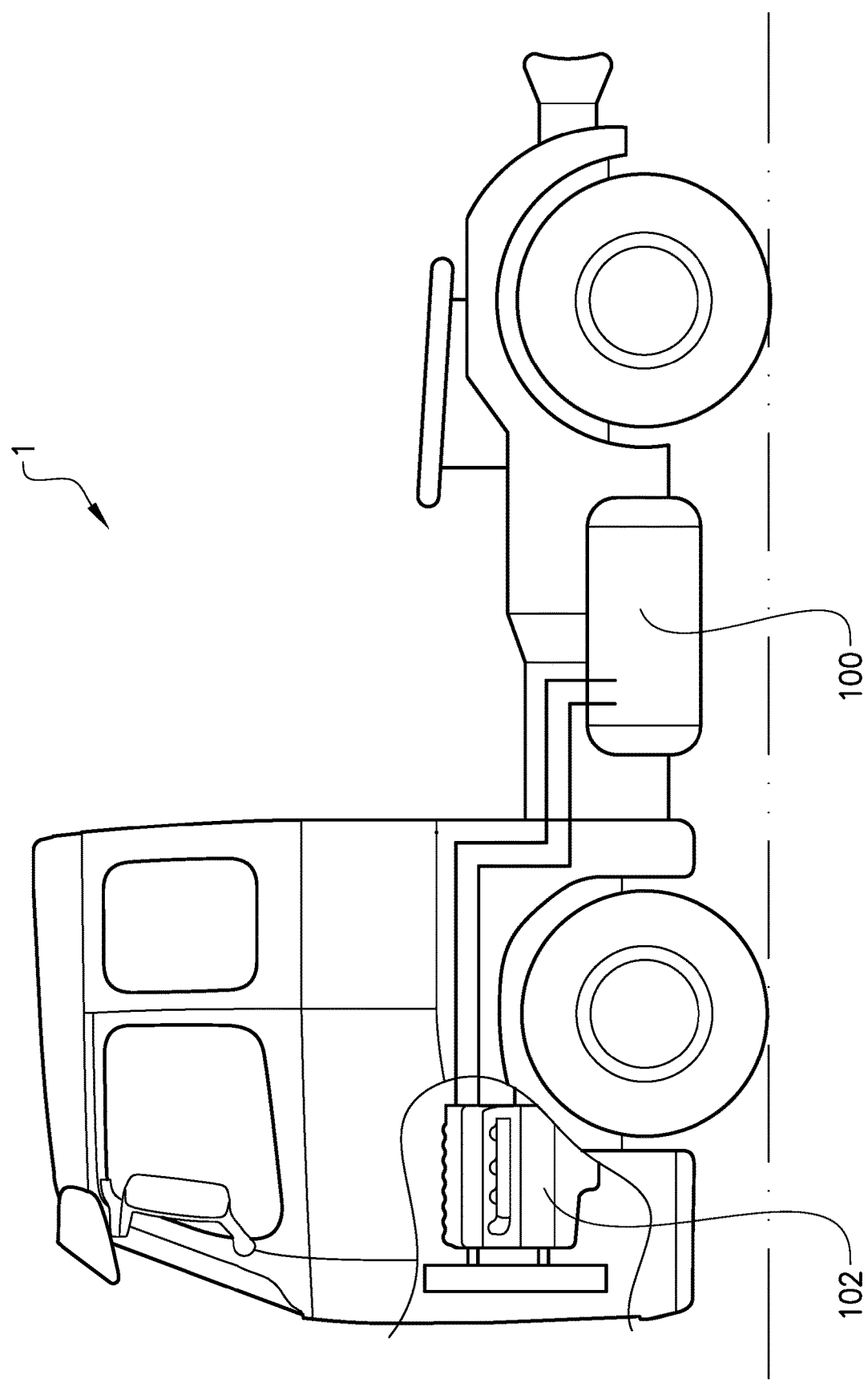
FIG. 1 is a lateral side view illustrating an example embodiment of a vehicle in the form of a truck.

The present invention will now be described more fully hereinafter with reference to the accompanying drawings, in which exemplary embodiments of the invention are shown. The invention may, however, be embodied in many different forms and should not be construed as limited to the embodiments set forth herein; rather, these embodiments are provided for thoroughness and completeness. Like reference character refer to like elements throughout the description.

With particular reference to FIG. 1, there is provided a vehicle 1 comprising an internal combustion engine 102. The internal combustion engine 102 may, for example, be a dual fuel internal combustion engine 102 which is connected to a fuel tank, such as e.g. a diesel tank, and to a gas tank arrangement 100, which gas tank arrangement 100 will be described in further detail below. The internal combustion engine 102 may thus be propelled by both conventional fuels such as e.g. diesel or petrol, as well as by a combustible gas such as e.g. compressed natural gas, DME, biogas, etc. The combustible gas may be provided either in a liquid phase i.e. a liquid/liquefied combustible gas, or in a gas phase. The vehicle 1 depicted in FIG. 1 is a heavy duty vehicle 1, here in the form of a truck, for which the inventive gas tank arrangement 100 is particularly suitable for.

Figure 2:
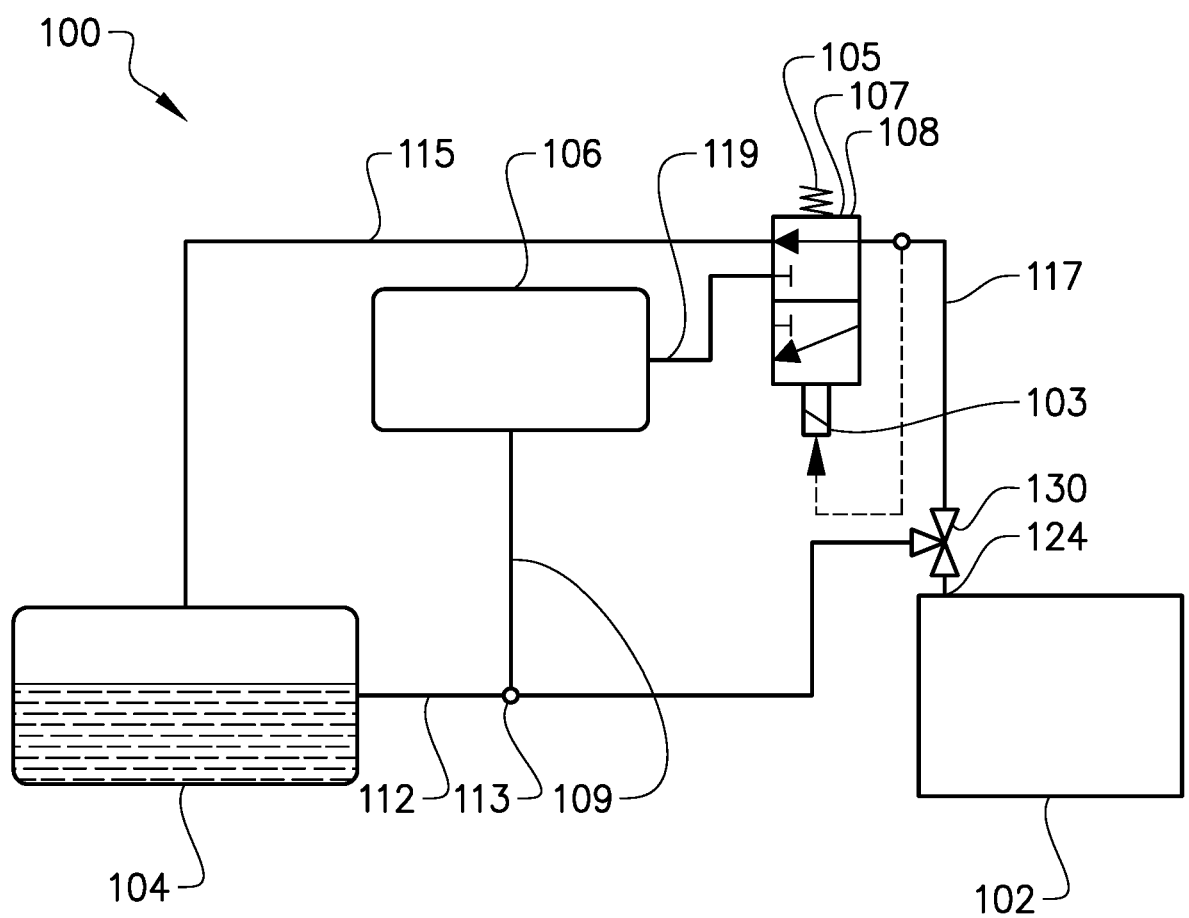
FIG. 2 is a schematic view illustrating an example embodiment of the gas tank arrangement according to the present invention.

Now, with reference to FIG. 2 an example embodiment of the gas tank arrangement 100 according to the present invention is depicted. The gas tank arrangement 100 comprises a gas tank 104 arranged for containing the combustible gas. The gas tank 104 is arranged upstream the internal combustion engine 102 for supply of combustible gas thereto via a fuel supply line 112. The combustible gas is preferably in liquid phase in a lower portion of the gas tank 104 and in gas phase in an upper portion of the gas tank 104. Furthermore, the gas tank 104 is preferably a gas tank pressure vessel arranged to contain a slightly compressed combustible gas. As a non-limiting example, the gas tank may be pressurized between 0-16 bar.

Furthermore, the gas tank arrangement 100 comprises an additional gas tank 106 arranged in upstream fluid communication with the internal combustion engine 102 for supply of combustible gas thereto. The additional gas tank 106 is arranged to contain combustible gas of higher pressure in comparison to the pressure level of the gas tank 104. As a non-limiting example, the gas pressure level in the additional gas tank is between 50-100 bar. Preferably, the combustible gas in the additional gas tank is arranged in gas phase.

The additional gas tank 106 is connected to the fuel supply line 112 at a position 113 downstream the gas tank 104 via a conduit 109 such that combustible gas from the gas tank 104 is mixed with combustible gas from the additional gas tank 106 in the fuel supply line 112 upstream the internal combustion engine 102.

Moreover, the gas tank arrangement 100 further comprises a valve arrangement 108. The valve arrangement 108 is arranged in fluid communication with the internal combustion engine 102. Preferably, the valve arrangement 108 is arranged in fluid communication with a fuel injection system 124 of the internal combustion engine 102.

Furthermore, the valve arrangement 108 is arranged in upstream fluid communication with the gas tank 104 via a conduit 115 and in upstream fluid communication with the additional gas tank 106 via a conduit 119. Hereby, combustible gas returned from the internal combustion engine 102, or more particularly, combustible gas which is not combusted in the cylinders of the internal combustion engine 102 but directed therefrom for a particular reason, is delivered to the valve arrangement 108. The valve arrangement 108 can be positioned in a first state and a second state. In the first state, the combustible gas is delivered from the internal combustion engine 102 to the gas tank 104. In the second state, the combustible gas is delivered from the internal combustion engine 102 to the additional gas tank 106. The valve arrangement 108 is controllable between the first and second states based on the pressure level of the combustible gas delivered from the internal combustion engine 102, where the valve arrangement 108 is switched from the first state to the second state when the pressure level of the combustible gas from the internal combustion engine 102 exceeds a predetermined limit.

In the example embodiment depicted in FIG. 2, the valve arrangement 108 is thus a gas pressure controlled valve arrangement. The combustible gas from the internal combustion engine 102 is delivered to the valve arrangement 108 via a conduit 117. Hereby, the pressure level of the combustible gas in the conduit 117 is determined and the valve arrangement 108 controlled accordingly. The valve arrangement 108 can be controlled by means of the combustible gas from the internal combustion engine 102 pushing on a first, lower portion 103 of the valve arrangement 108. When the gas pressure exceeds the predetermined limit, a springing means 105, or other suitable arrangement, at a second, upper portion 107 of the valve arrangement 108 is compressed for moving the valve arrangement 108 to the second state. When the pressure level is equal to, or below the predetermined threshold limit, the springing means 105 pushes the valve arrangement 108 to the first state. Other arrangement than a mechanically controlled valve as depicted in FIG. 2 may of course be used as well, such as e.g. an electronically controlled valve. Such electronically controlled valve may be provided with a sensor arranged to measure/determine the pressure level in the conduit 117 and control the valve to be positioned in the first state or the second state.

Accordingly, when the pressure level of the combustible gas from the internal combustion engine 102 is above the predetermined threshold level, for example above 50 bar, the combustible gas is delivered to the additional gas tank 106 and when the pressure level is below the threshold limit, the combustible gas is delivered to the gas tank 102.

Furthermore, the gas tank arrangement also comprises a valve 130 positioned downstream the gas tank 102. The valve 130 is preferable positioned in the intersection of the fuel supply line 112 and the conduit 117. Hereby, the combustible gas is directed from the fuel supply line 112 to the internal combustion engine 102 or from the internal combustion engine to the valve arrangement 108. Accordingly, the valve 130 is preferably preventing combustible gas to be delivered to the valve arrangement 108 during normal operation when the internal combustion engine 102 is propelled by combustible gas from the gas tank 104. Likewise, the valve 130 is preferably arranged to prevent combustible gas to be delivered to the fuel supply line 112 when controlling the combustible gas to be delivered from the internal combustion engine 104 to the valve arrangement 108. The valve 130 is preferably controlled by e.g. a vehicle control unit or engine control unit.

Figure 3:
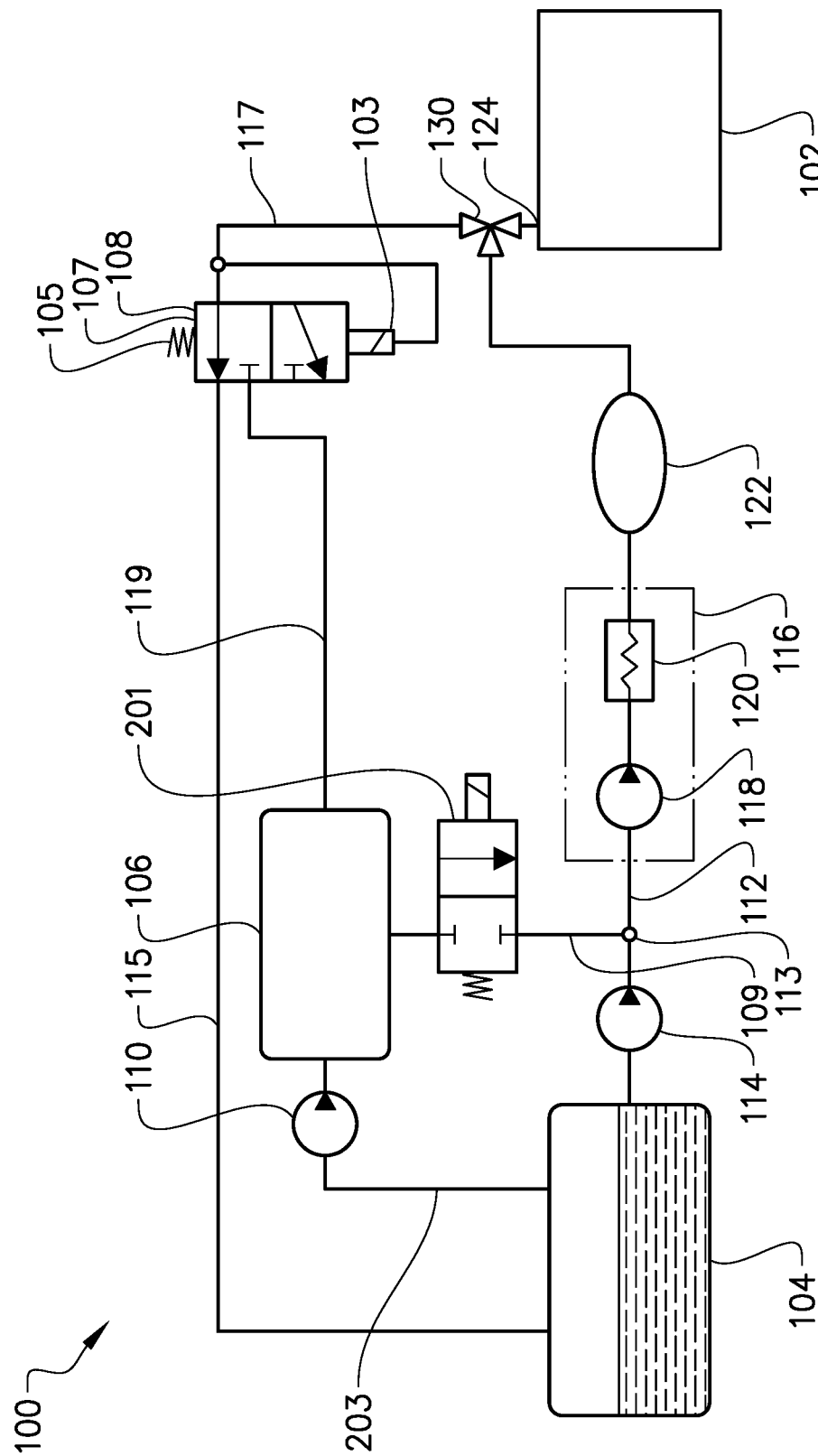
FIG. 3 is a schematic view illustrating another example embodiment of the gas tank arrangement according to the present invention.

Reference is now made to FIG. 3, which illustrates another example embodiment of the valve arrangement 100 according to the invention. The embodiment depicted in FIG. 3 comprises the features described above in relation to the description of FIG. 2. Similar features as described above will not be described further below unless indicated specifically.

As described above, the gas tank 104 is arranged in fluid communication with the internal combustion engine 102 via a fuel supply line 112. As depicted in FIG. 3, a first fuel pump 114 is positioned in the fuel supply line 112 downstream the gas tank 104. The first fuel pump 114 is thus arranged to receive combustible gas in liquid phase from the gas tank 104, whereby the pressure level thereof is increased. According to a non-limiting example, the first fuel pump 114 is a low pressure fuel pump arranged to increase the pressure level of the combustible gas from the gas tank 104 to a level slightly below the pressure level of the combustible gas received from the additional gas tank 106 at the position 113 where the additional gas tank 106 connects to the fuel supply line 112. The first fuel pump 114 is thus positioned between the gas tank 104 and the position 113 where the additional gas tank 106 connects to the fuel supply line 112. Moreover, the combustible gas delivered from the first fuel pump 114 is preferably in liquid phase.

Furthermore, the gas tank arrangement 100 comprises a gas converter arrangement 116. The gas converter arrangement 116 is arranged to convert low pressure combustible gas in liquid phase to high pressure combustible gas in gas phase. High pressure combustible gas in gas phase is preferable for delivery to the fuel injection system 124 of the internal combustion engine 102.

According to the example embodiment depicted in FIG. 3, the gas converter arrangement 116 comprises a second fuel pump 118 and an evaporating unit 120, which evaporating unit 120 is arranged downstream the second fuel pump 118. The second fuel pump 118 is thus arranged to further increase the pressure level of the liquefied combustible gas, or the mixture of combustible gas in gas phase and combustible gas in liquid phase. Thereafter, the high pressure combustible gas is evaporated in the evaporating unit 120 to be arranged in gas phase. According to a non-limiting example, the second fuel pump 118 is a high pressure fuel pump arranged to increase the pressure level of the combustible gas to approximately 500-550 bar before delivery to the evaporating unit 120.

Furthermore, the gas tank arrangement 100 comprises a second additional gas tank 122. The second additional gas tank 122 is positioned downstream the gas converter arrangement 116 and positioned in upstream fluid communication with the internal combustion engine 102. The second additional gas tank 122 is thus preferably arranged as a high pressure gas vessel configured to contain high pressure combustible gas in gas phase. According to a non-limiting example, the pressure level of the second additional gas tank 122 is approximately 500-550 bar. Hereby, high pressure combustible gas can be controllably delivered from the second additional gas tank 122 to the internal combustion engine 102 for propulsion thereof. According to the example depicted in FIG. 3, the above described valve 130 is positioned between the second additional gas tank 122 and the internal combustion engine 102 for controllably delivery of high pressure combustible gas thereto and for preventing high pressure combustible gas to be delivered to the valve arrangement during normal, gas propelling operation of the internal combustion engine 102. The valve 130 also prevents combustible gas to be delivered to the second additional gas tank 122 when there is a desire to direct combustible gas from the internal combustion engine 102.

Moreover, the gas tank arrangement 100 further comprises a conduit 203 arranged between the gas tank 104 and the additional gas tank 106. According to the example embodiment depicted in FIG. 3, the conduit 203 is connected to the upper portion of the gas tank 104 for delivery of combustible gas in gas phase to the additional gas tank 106. Hereby, the gas tank 104 can be vented in case the pressure level in the gas tank 104 exceeds a predetermined maximum limit.

Further, a compressor 110 is positioned in the conduit 203 between the gas tank 104 and the additional gas tank 106. Hereby, the pressure level of the combustible gas delivered from the gas tank 104 can be increased to the gas pressure level of the additional gas tank 106. According to a non-limiting example, the compressor 110 may be arranged as a low pressure compressor increasing the pressure of the combustible gas from the gas tank to a level of approximately 50-100 bar.

Still further, the gas tank arrangement 100 also comprises a second valve arrangement 201 positioned in the conduit 109 between the additional gas tank 106 and the fuel supply line 112. Hence, the second valve arrangement 201 is positioned in downstream fluid communication with the additional gas tank 106 for controllably delivery of combustible gas from the additional gas tank 106 to the fuel supply line 112, and thus, according to the example embodiment depicted in FIG. 3, to the gas converter arrangement 116.

Figure 4:
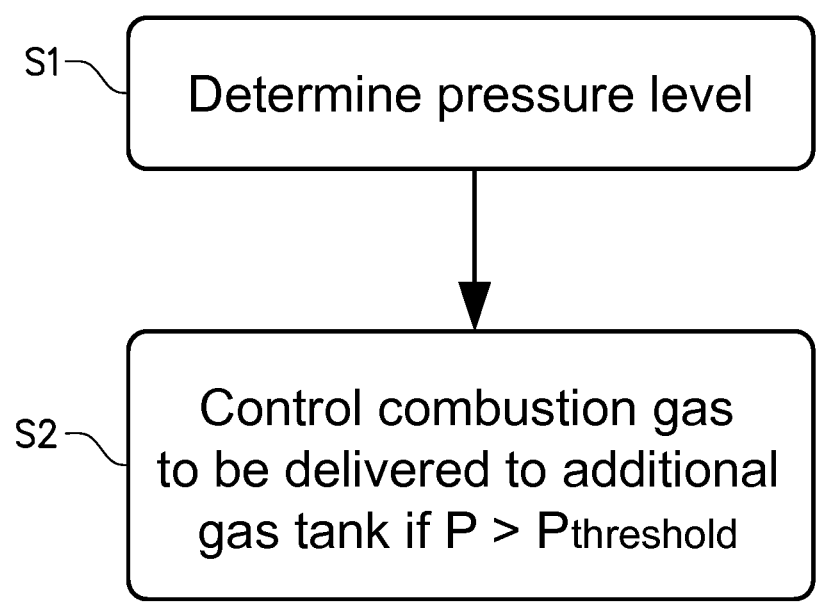
FIG. 4 is a flow chart of a method for controlling flow of combustible gas in the gas tank arrangements of FIGS. 2 and 3.

In order to describe the method of controlling flow of combustible gas from the internal combustion engine 102, reference is made to FIG. 4. When combustible gas is directed from the internal combustion engine 102, the pressure level thereof in the conduit 117 is determined 51. The pressure level can be determined automatically and mechanically by means of a mechanically controlled pressure valve. The pressure level can also be determined by means of a suitable pressure sensor (not shown). If the pressure level of the combustible gas in the conduit 117 is above a predetermined threshold limit, the combustible gas is controlled S2 to be delivered to the additional gas tank 106. If the pressure level is equal to, or below the predetermined threshold limit, the combustible gas is controlled to be delivered to the gas tank 104. The step of controlling S2 the combustible gas is preferably made by means of the valve arrangement 108 positioned in the conduit 117. The valve arrangement 108 as described above and depicted in FIGS. 2 and 3 can thus be positioned in the first state to deliver combustible gas to the gas tank 104 if the pressure level is equal to, or below the predetermined threshold level, and be positioned in the second state to deliver combustible gas to the additional gas tank 106 if the pressure level is above the predetermined threshold level.

It is to be understood that the present invention is not limited to the embodiments described above and illustrated in the drawings; rather, the skilled person will recognize that many changes and modifications may be made within the scope of the appended claims. For example, the gas tank arrangement 100 may comprise a variety of valves for controlling flow of combustible gas from e.g. the gas tank 104 to the additional gas tank 106 and/or the flow of combustible gas in the flow line 112 between the gas tank 104 and the internal combustion engine 102. Such valves may e.g. be controlled mechanically or electrically.

The invention claimed is:

1. A gas tank arrangement for an internal combustion engine, said gas tank arrangement comprising a gas tank for containing a combustible gas, and an additional gas tank arranged in upstream fluid communication with said internal combustion engine, wherein the gas tank arrangement further comprises a valve arrangement positioned in fluid communication with the internal combustion engine, said valve arrangement being further arranged in upstream fluid communication with the gas tank and the additional gas tank for controllably directing combustible gas from the internal combustion engine to either the gas tank or the additional gas tank, wherein the valve arrangement is controllable between a first state in which combustible gas from the internal combustion engine is directed to the gas tank and a second state in which combustible gas from the internal combustion engine is directed to the additional gas tank, and wherein the valve arrangement is controllable to be switched from the first state to the second state when a pressure level of the combustible gas from the internal combustion engine exceeds a predetermined threshold limit at the valve arrangement.

2. The gas tank arrangement according to claim 1, wherein the valve arrangement is a gas pressure controlled valve arrangement.

3. The gas tank arrangement according to claim 1, wherein the valve arrangement is a mechanically controlled valve arrangement.

4. The gas tank arrangement according to claim 1, wherein the gas tank is arranged in upstream fluid communication with the additional gas tank.

5. The gas tank arrangement according to claim 4, wherein the gas tank arrangement further comprises a compressor arranged in fluid communication between the gas tank and the additional gas tank.

6. The gas tank arrangement according to claim 1, wherein the gas tank arrangement comprises a fuel supply line between the gas tank and the internal combustion engine, and the gas tank arrangement further comprises a first fuel pump arranged in said fuel supply line.

7. The gas tank arrangement according to claim 6, wherein said additional gas tank is connected to said fuel supply line at a position downstream of said first fuel pump.

8. The gas tank arrangement according to claim 6, wherein the gas tank arrangement comprises a gas converter arrangement arranged to convert liquefied combustible gas to compressed combustible gas, said gas converter arrangement being positioned in said fuel supply line downstream of said first fuel pump.

9. The gas tank arrangement according to claim 8, wherein said gas converter arrangement comprises a second fuel pump and an evaporating unit positioned in fluid communication with said second fuel pump.

10. The gas tank arrangement according to claim 1, said gas tank arrangement further comprising a second additional gas tank arranged in downstream fluid communication with the gas tank.

11. The gas tank arrangement according to claim 10, wherein the second additional gas tank is a high pressure gas vessel configured to contain compressed combustible gas adapted to be delivered to a fuel injection system of the internal combustion engine.

12. The gas tank arrangement according to claim 1, wherein the gas tank arrangement is part of a vehicle comprising an internal combustion engine, wherein said internal combustion engine is arranged downstream of the gas tank arrangement.

13. The gas tank arrangement according to claim 12, wherein the internal combustion engine is a dual fuel internal combustion engine.

14. A method for controlling flow of combustible gas in a gas tank arrangement, said gas tank arrangement comprising a gas tank for containing a combustible gas, and an additional gas tank, said gas tank and additional gas tank being arranged in fluid communication with an internal combustion engine, wherein the method comprises the steps of:
determining a pressure level of a combustible gas delivered from the internal combustion engine at a valve arrangement positioned in fluid communication with the internal combustion engine, said valve arrangement being further arranged in upstream fluid communication with the gas tank and the additional gas tank; and
controlling the combustible gas to be delivered to the additional gas tank if the pressure level of the combustible gas from the internal combustion engine is above a predetermined threshold limit at the valve arrangement.

* * * * *